(12) United States Patent
Moller et al.

(10) Patent No.: US 10,082,913 B2
(45) Date of Patent: Sep. 25, 2018

(54) EMBROIDERED SENSOR ASSEMBLY

(71) Applicant: Microsoft Technology Licensing, LLC, Redmond, WA (US)

(72) Inventors: Christian Juland Moller, Redmond, WA (US); James David Holbery, Bellevue, WA (US); John Guido Atkins Weiss, Lake Forest Park, WA (US); Aric A. Fitz-Coy, Seattle, WA (US); Stephanie Jo Rodgers-Ahnen, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/708,277

(22) Filed: May 10, 2015

(65) Prior Publication Data

US 2016/0328043 A1    Nov. 10, 2016

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01); *G06F 2203/04102* (2013.01)

(58) Field of Classification Search
None
See application file for complete search history.

(56) References Cited

U.S. PATENT DOCUMENTS

| | | | |
|---|---|---|---|
| 4,735,847 A | 4/1988 | Fujiwara et al. |
| 5,538,781 A | 7/1996 | Rao et al. |
| 5,906,004 A | 5/1999 | Lebby et al. |

(Continued)

FOREIGN PATENT DOCUMENTS

| | | |
|---|---|---|
| CN | 101240475 | 7/2012 |
| DE | 102006046490 | 4/2008 |
| WO | WO-2014043325 | 3/2014 |

OTHER PUBLICATIONS

"Delicol Foldable Flexible Waterproof Keyboard", Retrieved on: May 18, 2015 Available at: http://www.amazon.com/Delicol-Foldable-Flexible-Waterproof-Compatible/dp/B00FGSB71W/ref=sr_1_2?ie=UTF8&qid=1429855543&sr=8-2&keywords=flexible+keyboard, 7 pages.

(Continued)

*Primary Examiner* — Kent Chang
*Assistant Examiner* — Benjamin Morales Fernande

(57) ABSTRACT

Embroidered sensor assemblies are described that are formed on a flexible substrate, such as a suitable fabric material. Conductive patterns are embroidered into the flexible substrate to form an array of sensors that can be configured in various ways and used in many different applications. A sensor assembly can implement touch sensitive sensors arranged to recognize input by measuring capacitance. The sensor assembly can also implement pressure and/or force sensitive controls for an input device, such as a keyboard. Other types of sensing are also contemplated such as detection of proximity, motion, flow, gestures, and/or strain. A conductive pattern can be formed in a single layer of material and/or via a single continuous run of conductive material. The embroidered sensor assembly is flexible and therefore can be shaped to conform to various different kinds of objects and form "smart" surfaces for those objects.

20 Claims, 10 Drawing Sheets

(56) References Cited

U.S. PATENT DOCUMENTS

| | | | |
|---|---|---|---|
| 6,210,771 B1 | 4/2001 | Post et al. | |
| 6,381,482 B1 | 4/2002 | Jayaraman et al. | |
| 6,861,961 B2* | 3/2005 | Sandbach | G06F 3/023 |
| | | | 178/18.05 |
| 7,461,444 B2 | 12/2008 | Deaett et al. | |
| 7,719,007 B2 | 5/2010 | Tompkins et al. | |
| 8,006,633 B2 | 8/2011 | Bennett et al. | |
| 8,022,307 B2 | 9/2011 | Chu et al. | |
| 8,331,097 B2 | 12/2012 | Yang et al. | |
| 8,362,882 B2 | 1/2013 | Heubel et al. | |
| 8,752,285 B2 | 6/2014 | Son et al. | |
| 8,797,292 B2 | 8/2014 | Reynolds et al. | |
| 2002/0121146 A1* | 9/2002 | Manaresi | B63H 9/06 |
| | | | 73/862.68 |
| 2002/0134828 A1* | 9/2002 | Sandbach | G06F 1/1632 |
| | | | 235/60.12 |
| 2004/0173028 A1 | 9/2004 | Rix | |
| 2006/0258247 A1* | 11/2006 | Tao | D03D 1/0088 |
| | | | 442/301 |
| 2007/0141939 A1* | 6/2007 | Sandbach | H01H 3/141 |
| | | | 442/304 |
| 2008/0050550 A1 | 2/2008 | Orth | |
| 2010/0071205 A1 | 3/2010 | Graumann et al. | |
| 2010/0206614 A1* | 8/2010 | Park | H01H 13/88 |
| | | | 174/126.1 |
| 2011/0240091 A1 | 10/2011 | Forster et al. | |
| 2011/0290304 A1 | 12/2011 | Daniel | |
| 2012/0305050 A1 | 12/2012 | Lerner et al. | |
| 2014/0020484 A1* | 1/2014 | Shaw | G01L 1/146 |
| | | | 73/862.625 |
| 2014/0070957 A1 | 3/2014 | Longinotti-Buitoni et al. | |
| 2015/0153862 A1* | 6/2015 | Nakamura | G06F 3/041 |
| | | | 345/173 |
| 2015/0242012 A1* | 8/2015 | Petcavich | G06F 1/1652 |
| | | | 345/174 |
| 2016/0048235 A1* | 2/2016 | Poupyrev | G06F 3/044 |
| | | | 345/174 |

OTHER PUBLICATIONS

"Generic USB 2.0 109Keys Flexible Silicone Washable Keyboard Full-Size", Retrieved on: May 18, 2015 Available at: http://www.amazon.com/Flexible-Silicone-Washable-Full-Size-Compatible/dp/B00ENH8SZK/ref=sr_1_5?ie=UTF8&qid=1429855543&sr=8-5&keywords=flexible+keyboard, 6 pages.

"Monoprice Deluxe Ultra-Slim Flexible Keyboard—Retail Packaging—Black", Retrieved on: May 18, 2015 Available at: http://www.amazon.com/Monoprice-Deluxe-Ultra-Slim-Flexible-Keyboard/dp/B0069M8Y4C/ref=sr_1_1?ie=UTF8&qid=1429855543&sr=8-4&keywords=flexible+keyboard, 7 pages.

Stoppa, "Wearable Electronics and Smart Textiles: A Critical Review", In Proceedings of Sensors, vol. 14, Issue 7, Jul. 7, 2014, pp. 11957-11992.

Turcic, "ElekTex Fabric Wireless Keyboard", Available at: http://www.mobileread.com/forums/showthread.php?t=5767, Jan. 19, 2006, 2 pages.

"International Search Report and Written Opinion", Application No. PCT/US2016/026307, dated May 25, 2016, 12 pages.

"Second Written Opinion", Application No. PCT/US2016/026307, dated May 18, 2017, 8 pages.

"International Preliminary Report on Patentability Issued in PCT Application No. PCT/US2016/026307", dated Aug. 11, 2017, 9 Pages.

* cited by examiner

EMBROIDERED SENSOR ASSEMBLY

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
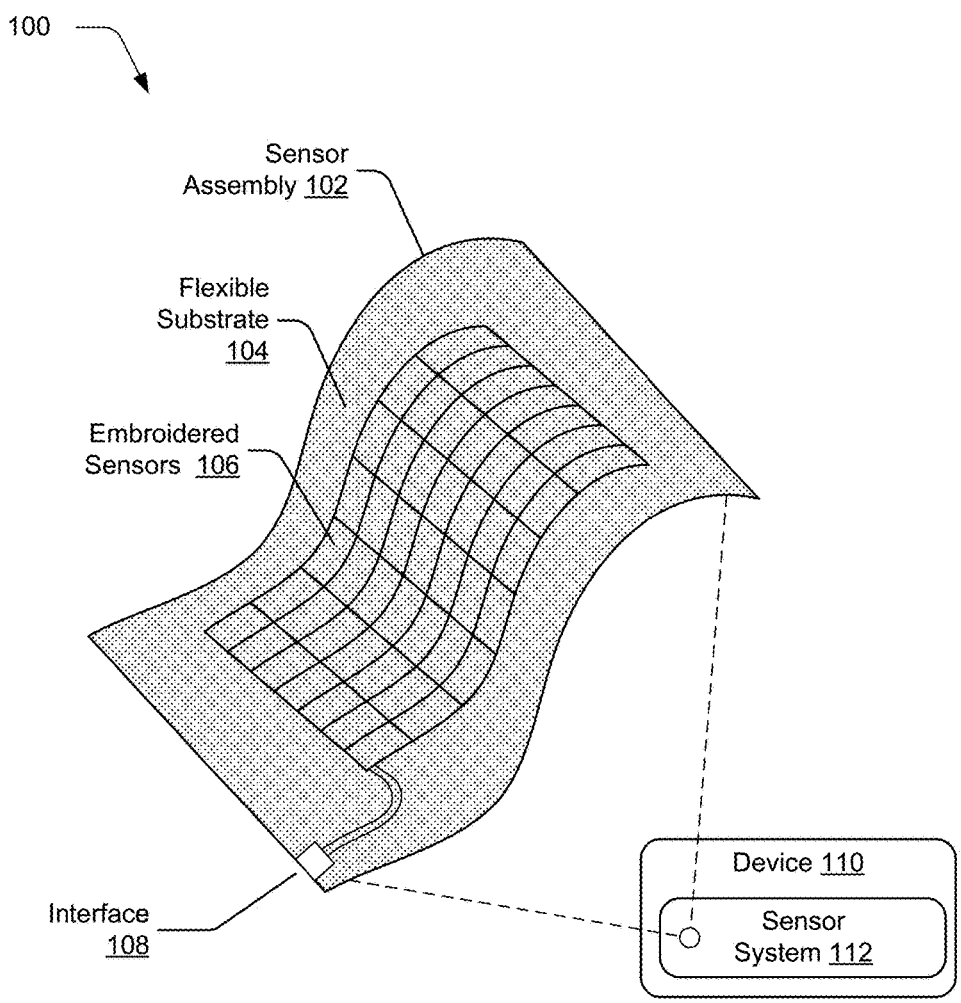
FIG. 1 is an illustration of an example embroidered sensor assembly in accordance with one or more implementations.

Designers of devices are continually looking to improve the accuracy and efficiency of touch, gestural, and other input mechanisms supported by devices to make it easier for users to interact with device, and thereby increase the popularity and utility of the devices. Traditionally, sensor systems utilize rigid components, such as printed circuit boards (PCBs), which makes it difficult to shape the sensors and/or include sensors in flexible or irregularly shaped objects and surfaces. Thus, the rigidity of traditional sensor systems limits the ways in which the sensors may be employed and the kinds of devices that can make use of the sensor systems.

An embroidered sensor assembly is described herein. In one or more implementations, the embroidered sensor assembly is formed on a flexible substrate, such as a suitable fabric material. Conductive patterns are sewn or stitched into the flexible substrate using embroidery techniques to form an array of sensors that can be configured in various ways and used in many different applications. The conductive patterns form nodes and/or electrodes that correspond to positions of individual sensing points. In an implementation, the sensor assembly implements a plurality of touch sensitive sensors arranged to enable detection of distortions in an electrostatic field applied to the array that are measurable as changes in capacitance. Sensors may be arranged to measure mutual capacitance or self-capacitance. The sensor assembly can also implement conductive nodes configured to implement pressure and/or force sensitive controls for an input device, such as a keyboard, trackpad, mouse, etc. Other types of sensing are also contemplated such as for detection of proximity, controls, switches, motion detection, tracking, game controllers, wearable garment embedded control, communication indicators. In one approach, the conductive pattern is formed in a single layer of material and may also be formed via a single continuous run of conductive material (e.g., a contiguous metal wire).

The embroidered sensor assembly is flexible and therefore can be shaped to conform to various different kinds of objects and form "smart" surfaces for those objects. For instance, an embroidered sensor assembly can be manipulated into a selected shape and embedded within a rigid structure to form a composite object that includes a touch sensitive surface (or other sensing system). In one approach, a composite object can be formed by thermoforming a polymer, carbon fiber, or other material to encompass the embroidered sensor assembly. Various devices and objects are contemplated that can be configured to take advantage of embroidered sensor assemblies described in this document including, but not limited to, mobile computing devices, articles of clothing, wearable devices, sports equipment, keyboards and input devices, protective gear, smart appliances, industrial equipment including pipes, structures, and vehicles, embedded gauges, flexible displays, and so forth.

Embroidered Sensor Assembly

FIG. 1 depicts generally at 100, an example embroidered sensor assembly in accordance with one or more implementations. In particular, a sensor assembly 102 is represented that includes a flexible substrate 104 and an arrangement of embroidered sensors 106 that are embroidered (e.g., stitched or sewn) into the flexible substrate 104. In this example, the embroidered sensors 106 are depicted as being arranged as a generally rectangular grid or array of conductive wires or threads in rows and columns. The conductive wires may be configured as thin strands of metal such a copper or using another conductive material. The wires may have a diameter in range of about thirty to one hundred microns. Even larger diameter sizes up to several millimeters (e.g., approximately 2 mm to 5 mm) may also be used depending up the end use scenario. The conductive wires form intersections (e.g., nodes and/or electrodes) that correspond to positions of individual sensing points. Although a rectangular grid arrangement is depicted, other patterns are also contemplated such as, by way of example and not limitation, hexagonal arrangements, concentric circles, a spiral arrangement, parallel lines, horizontal rows, vertical columns, individual points, and irregular arrangements.

The flexible substrate 104 is representative of a flexible base material that is suitable for embroidering of the embroidered sensors 106. By way of example and not limitation, the flexible substrate 104 may be configured using various fabric materials. The fabric materials can include woven and non-woven textiles as well as synthetic and natural fabrics. Flexible plastic and polymers substrates are also contemplated.

As discussed above and below, the sensor assembly 102 can be configured to implement various kinds of sensors and sensing. For example, embroidered sensors 106 can include capacitive sensors that enable detection of changes in capacitance at or near the surface of the sensor assembly 102. The changes in capacitance are due to the presence of a finger or object (e.g., stylus) in proximity to a sensor the causes distortions in an electrostatic field applied to the sensors. Sensors may be arranged to measure mutual capacitance or self-capacitance. The sensor assembly can also implement conductive nodes configured to enable pressure and/or force sensitive controls for an input device, such as a keyboard, trackpad, mouse, etc. The embroidered sensors 106 can be configured to implement touch sensing functionality in some scenarios and therefore may be referred to as touch sensitive sensors. Touch sensitive sensors implemented by a sensor assembly 102 can operate based on measurements for mutual capacitance or self-capacitance made via embroidered sensors 106 as noted previously. Other kinds of touch sensitive sensors and systems are also contemplated, such as a sensor assembly 102 configured as a resistive panel touch surface. Further, types of sensing other than touch sensing are also contemplated such as detection of proximity, motion, flow direction and rates, gestures, and/or strain, to name a few examples.

The sensor assembly 102 additionally includes an interface 108. The interface 108 represents any suitable component that is configured to establish a connection for communication of data including signals, messages, and commands between the sensor assembly 102 and other components and/or devices. The interface 108 can include a connector that is designed to mate with a corresponding connector of another component to establish the connection. For example, a multiple pin connector may be used to connect the sensor assembly 102 to a controller, computing device, processing system or other component configured to interact with the embedded sensors to obtain and interpret input signals and other data that is collected via the sensors. In an implementation, the interface 108 may include an integrated controller that is designed to control the sensor assembly 102 and perform at least some processing to interpret sensor data. The interface 108 can be configured to form a wired connection via mating of physical connectors of different components/devices and/or a wireless connection to an external device via a network using various wireless communication protocols, antennas, radios and hardware. The communicative coupling implemented via the interface 108 enables exchange of various kinds of communications for operation of the sensor assembly 102 and control over functionality of one or more devices based on sensor data collected via the embroidered sensors 106.

As represented in FIG. 1, the sensor assembly 102 may be configured as a component of a device 110 in one or more implementations. In particular, the sensor assembly 102 may be connected to and/or integrated with a sensor system 112 of the device 110. The device 110 represents any suitable device, structure, or object that can be configured to make use of an embroidered sensor assembly as described above and below. Generally, the sensor assembly 102 is integrated with a device 110 to provide one or more "smart" surfaces and/or controls, such as having a touch sensitive surface that is embedded in, adhered to, or otherwise combined with the device. More generally, embroidered sensors 106 can be configured as various different kinds of sensors to create a system capable of detecting one or more of touches on a smart surface (direct contact), proximity to the surface (e.g., hovering just above the surface and/or other proximate inputs), forces applied to the surface (pressure, torque, sheer), deformations of the surface or sensors (bending and twisting, strain), and so forth. One or more different types of embroidered sensors 106 can be included within the same sensor assembly. Additionally, different arrangements of sensors can be used in different scenarios and the number of sensors employed and the size of the assembly can also be adapted for different devices and end-use applications.

The sensor system 112 of the device is configured to control the sensor assembly 102 and collect data and signals from the sensors (e.g., sensor data). The sensor system 112 can perform processing to interpret and utilize sensor data in various ways and/or invoke a processing system and/or other devices/components to initiate processing of sensor data. Control actions for operation of the device and functionality provided via the device are selectively performed based on processing of the sensor data. By way of example and not limitation, control actions may include but are not limited to launching of selected applications, controlling content navigation via a user interface, operating hardware devices, actuating switches and toggles, triggering events, recording data, process control operations, switching device modes, character input, and gesture recognition and handling, to name a few examples. Details regarding these and other aspects of embroidered sensor assemblies are discussed in relation to the following figures.

Example Devices

Figure 2:
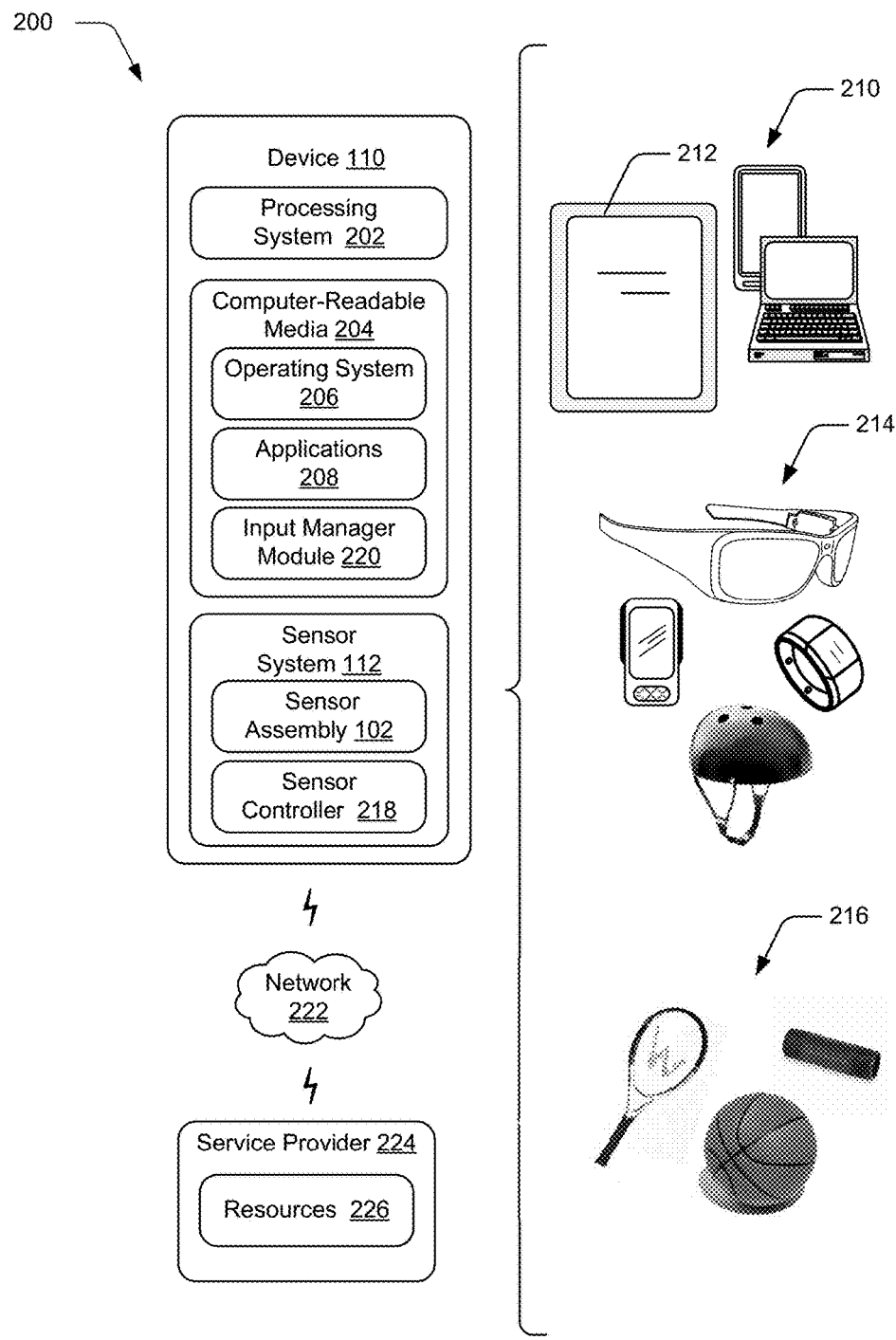
FIG. 2 depicts details of an example device that includes an embroidered sensor assembly in accordance with one or more implementations.

FIG. 2 depicts generally at 200 an example operating environment including details of an example device(s) having an embroidered sensor assembly in accordance with one or more implementations. In particular, the environment includes a device 110 having a processing system 202 with one or more processors and processing components (e.g., CPUs, GPUs, microcontrollers, hardware elements, fixed logic devices, etc.), one or more computer-readable media 204, an operating system 206, and one or more applications 208 that reside on the computer-readable media and which are executable by the processing system. The processing system 202 may retrieve and execute computer-program instructions from applications 208 to provide a wide range of functionality to the device 108, including but not limited to gaming, office productivity, email, media management, printing, networking, web-browsing, and so forth. A variety of data and program files related to the applications 208 can also be included, examples of which include games files, office documents, multimedia files, emails, data files, web pages, user profile and/or preference data, and so forth.

In implementations, the device 110 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. For example, as shown in FIG. 2, the device may be any type of portable computer, mobile phone, or other portable device 210 that includes an integrated display 212. Traditional desktop computers and set-top boxes are also contemplated. A device may also be configured as a wearable device 214 that is designed to be worn by, attached to, carried by, or otherwise transported by a user. Examples of wearable devices 214 depicted in FIG. 2 include glasses, a smart band or watch, a helmet, and a pod device such as clip-on fitness device, media player, or tracker. Other examples of wearable devices 214 include but are not limited to a ring, an article of clothing, a glove, protective gear, sports pads, and a bracelet, to name a few examples.

Further, a device may also be configured as any kind of smart object 216 that includes or otherwise makes use of an embroidered sensor assembly. An embroidered sensor assembly can be embedded in, attached to, or otherwise associated with various different kinds of smart objects including sports equipment, furniture, appliances, industrial equipment, and other manufactured goods. Examples of smart objects 216 depicted in FIG. 2 include a tennis racquet, a basketball, and a length of pipe. Additional example include a lamp, door and/or lock, molded plastic products for automobiles or aircraft, a lounge chair, a coffee maker, input devices such as a keyboard or mouse, and so forth.

Any of the devices can be implemented with various components, such as one or more processors and memory devices, as well as with any combination of differing components. For instance, the device 110 is represented as having a full complement of processing, memory, and software resources as well as a sensor assembly 10 as discussed in relation to FIG. 1. Some devices, such as some wearable device 214 and smart objects 216, may be configured to have a limited set of resource and such devices may include just the sensor assembly 102 or a scaled down set of the represented components (e.g., basic memory, simple controller, and/or limited applications). One example of a computing system that can represent various systems and/or devices is shown and described below in relation to FIG. 10.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 10.

As noted, the device 110 is depicted as having a sensor system 112 that includes a sensor assembly 102 as described herein. In particular, the sensor assembly 102 is configured to provide a plurality of embroidered sensors 106 that are embroidered on a flexible substrate 104 as discussed in relation to the example of FIG. 1. In this example, the sensor system 112 includes a sensor controller 218 that represents functionality operable to manage and control the embroidered sensors 106 of the sensor assembly 102. For instance, the sensor controller 218 can perform processing to interpret and utilize sensor data in various ways. In addition or alternatively, sensor controller 218 can invoke the processing system 202, operating system 206, and/or other components of the device to initiate handling of sensor data. In some scenarios, the sensor controller 218 communicates with a separate external device to exchange data related to sensors and appropriate control actions. For example, data collected via a smart object such as the example tennis racquet can be communicated via a wired or wireless connection for storage and handling by an associated a smart phone or desktop computer.

The device 102 is additionally illustrated as including an input manager module 220 that can operate in conjunction with the sensor system 112 and sensor controller 218 for handling of sensor data. In particular, the input manager module 220 is representative of functionality relating to processing of inputs and rendering outputs of the computing device 110. A variety of different inputs may be processed by, such as inputs relating to interaction with sensors of the sensor system 112, keys of a keyboard, identification of gestures based on inputs, and so forth. Responsive to various inputs, input manager module 220 causes corresponding operations and/or control actions to be performed. Thus, the input manager module 220 may support a variety of different input techniques by recognizing and leveraging a division between types of inputs including key presses, gestures, control interactions, and so on.

The environment further depicts that the device 110 may be communicatively coupled via a network 222 to a service provider 224, which enables the device 110 to access and interact with various resources 226 made available by the service provider 224. The resources 226 can include any suitable combination of content and/or services typically made available over a network by one or more service providers. For instance, content can include various combinations of text, video, ads, audio, multi-media streams, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service. In an implementation, sensor data collected via a sensor assembly 102 as described herein can be communicated over the network 222 for storage and handling via a service or web application implemented by service provider 224.

Touch Sensing Functionality Via an Embroidered Sensor Assembly

Figure 3:
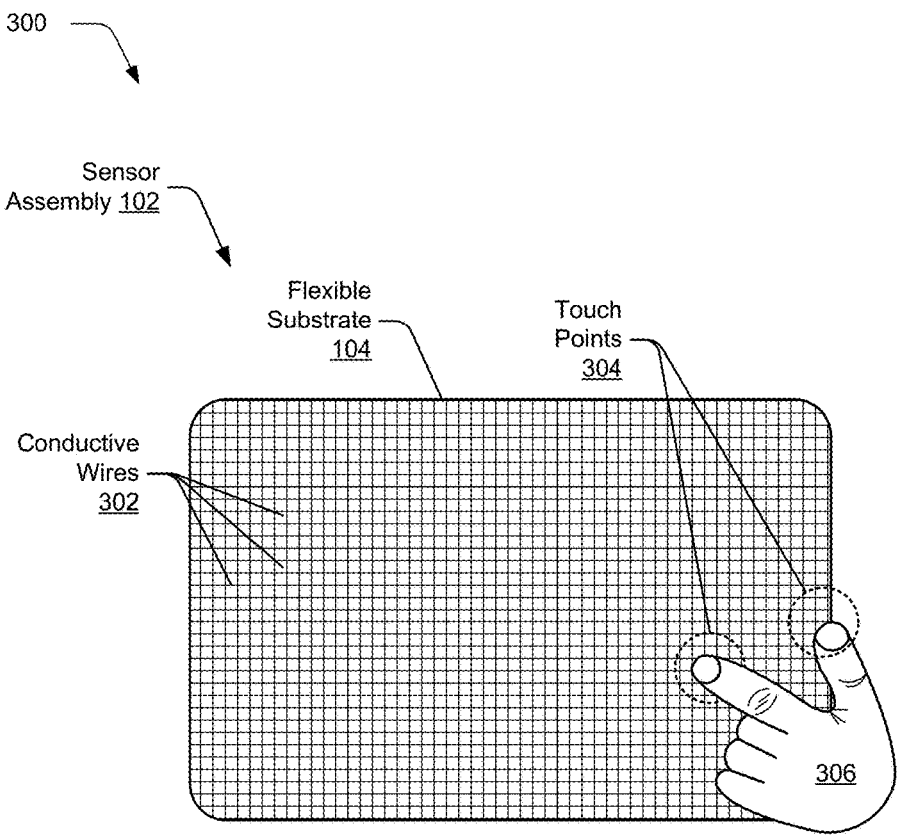
FIG. 3 depicts an example embroidered sensor assembly that implements touch functionality for touch recognition in accordance with one or more implementations.

FIG. 3 depicts generally at 300 an example embroidered sensor assembly that implements touch functionality for touch recognition in accordance with one or more implementations. In this example, the sensor assembly 102 for a device 110 is configured as conductive wires 302 that are embroidered in a grid (e.g., rows and columns) across the flexible substrate 104. As noted previously, the flexible substrate 104 may be any suitable fabric material. In the depiction of FIG. 3, the conductive wires establish a grid upon which various touch points 304 from a user's hand 306 (or other objects) may be detected and tracked. Although rows and columns are shown, other layouts of embroidered sensors are also contemplated, such as a circular pattern, parallel traces, a spiral arrangement, or other pattern.

The arrangement of FIG. 3 implements touch functionality through a plurality of embroidered sensors, which operate as touch sensitive sensors. The touch sensitive sensors can be used to determine touch points 304, proximity, and/or gestures applied to the surface of the sensor assembly 102 (or in close proximity to the surface). Touch points 304 that are recognized can be used to drive corresponding operations and/or selectively enable particular device functionality associated with interaction at the touch points 304.

Touch sensitive sensors that are formed as embroidered sensors as described herein can be configured in various ways. In one or more implementations the touch sensitive sensors operate as capacitive sensors that enable detection of changes in capacitance. In this example, the pattern of conductive wires form nodes and/or electrodes at intersections of the pattern that correspond to positions of individual sensing points. The touch sensitive sensors enable detection of distortions in an electrostatic field applied to the sensor array that are measurable as changes in capacitance. Sensors may be arranged to measure mutual capacitance or self-capacitance at individual sensing points. Other kinds of touch sensitive sensors and systems are also contemplated, such as a sensor assembly 102 configured as a resistive panel touch surface.

Thus, a sensor assembly 102 having embroidered conductive wires can implement touch sensitive sensors that form a flexible touch panel or surface for inclusion in various devices and smart objects. The touch sensitive sensors can be employed to create various control elements for the devices/objects that respond to touch. In implementations, a touch panel or surface can be embedded into a rigid structure in the manner described above and below. A touch panel created in this way can be used to form an input device such as a keyboard, mouse, touch sensitive display, or trackpad that responds to touch. A touch panel/surface that includes embroidered sensors can also be integrated into different types of objects such as in sports equipment, articles of clothing, protective gear, appliances, industrial equipment, furniture, structures for vehicles (e.g., car, planes, etc.), and so forth. A touch panel/surface that is included with a device or object can provide touch sensing functionality and/or other types of sensing supported by the touch sensitive sensors such as detection of proximity, motion, flow direction and rates, gestures, and/or strain, to name a few examples.

In one or more implementations, the pattern of conductive wires is formed as a single layer. In other words, the sensor assembly 102 is formed using one layer of the flexible substrate. This is in contrast to traditional techniques for sensor arrays and touch panels that utilize multiple different layers that are stacked and/or laminated together to produce the sensor system. Using a single layer simplifies the embroidery process and can reduce material costs. In at least some arrangements, some or all of the conductive wires are insulated metal wires, such as a copper wire that is surrounded by an insulating coating. Insulation of the wires used to form embroidered sensors enables isolation of different nodes and/or portions of a sensor array that prevents interference and cross signals. Of course two or more substrate layers having embroidered sensors as described herein for some device implementations and end use scenarios.

In one particular example, the sensor assembly 102 is configured as an array of mutual-capacitive sensors that are formed by embroidering insulated conductive wires in a single layer of flexible substrate. In this arrangement, the embroidered pattern forms driving lines and sensing line for the mutual-capacitive sensors that are included within the single layer (e.g., the same layer). The mutual-capacitive sensors enable sensing of individual touch points 304 as well as multi-point touches though measurement of capacitive changes. The mutual-capacitive sensors can also be employed to measure presence, proximity, directions, gestures, motion, and so forth.

Input Device Having an Embroidered Sensor Assembly

As noted, a sensor assembly 102 as described herein can be employed to produce an input device having a plurality of controls corresponding to nodes formed by the arrangement of sensors. Various input devices are contemplated such as a keyboard, trackpad, mouse, or other input device. Since the sensor assembly 102 is flexible, the input device can be formed as a flexible input device. Of course, an input device can also be formed by embedding of a sensor assembly 102 within a rigid structure as described in this document.

Figure 4:
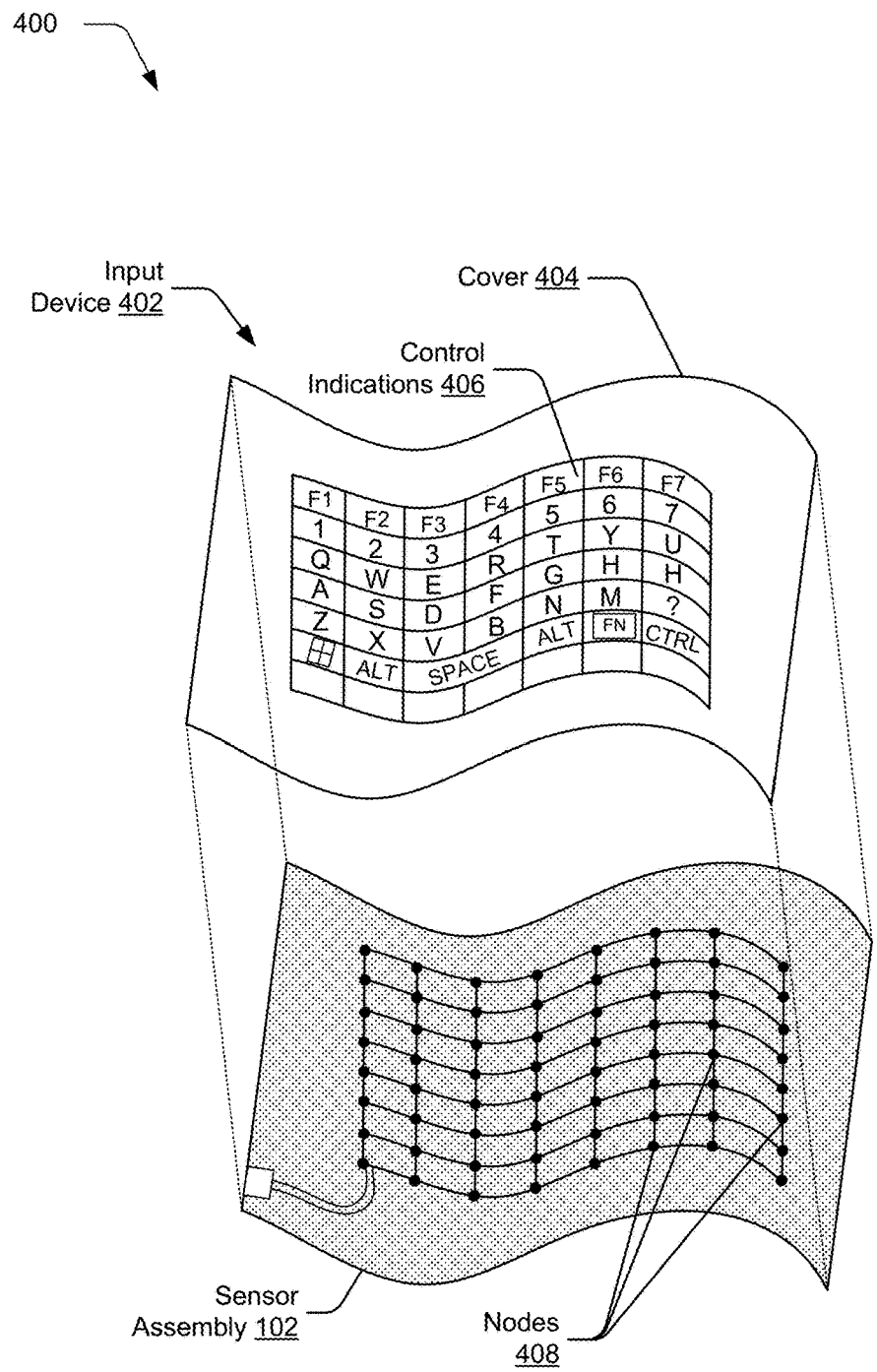
FIG. 4 depicts an example input device that utilizes an embroidered sensor assembly in accordance with one or more implementations.

FIG. 4 depicts generally at 400 an example input device 402 that utilizes an embroidered sensor assembly 102 in accordance with one or more implementations. In the illustrated example, the input device 402 is represented as a keyboard although other kinds of input devices are also contemplated. Generally, the input device 402 includes a sensor assembly 102 as described herein that may be formed as a layer of flexible substrate 104 having embroidered sensors 106. The sensor assembly 102 can be joined to a cover 404 that includes control indications 406 corresponding to sensing points or nodes that are formed via the embroidered pattern in the sensor assembly 102. For example, the control indications 406 in FIG. 4 represent key indications for keys of a keyboard device. For simplicity, a partial representation of a QWERTY keyboard and corresponding keys is depicted.

As further represented, the sensor assembly 102 can include nodes 408 designed to operate as contacts points for operation of corresponding keys or controls. The nodes 408 can be implemented as raised protrusions that are formed in the embroidered pattern. The raised nodes or "bulbs" may be raised in the range of about twenty to one hundred microns above a surface of the assembly. Nodes 408 can be located at intersection points of the embroidered wires. By way of example, the nodes 408 may be formed by stitching of additional material at selected contact points to form the raised protrusions. In addition or alternatively, portions of the embroidered wire and/or a surrounding insulator can be melted using a laser or other mechanism to form the raised protrusions as conductive contact points for the input device 402.

Thus, a circuit for operation of a keyboard or other input device 402 (e.g., mouse, touch pad, etc.) can be formed using an embroidered sensor assembly. Controls or keys for the input device 402 can operate based on touch detection using touch sensitive sensors as described herein. Thus, recognition of touch in relation to a particular control indication 406 causes a corresponding control action.

In addition or alternatively, the nodes 408 can be configured to implement a force-to-fire mechanism to trigger operation of corresponding controls. In this approach, a node 408 corresponding to a particular key comes in contact with the cover 404 when pressure/force is applied to a control indication 406 for the particular key. This causes input of a corresponding character or another designated control action associated with the particular key to occur.

In one approach, the cover 404 can also include conductive traces or protrusions associated with the control indications 406. These conductive traces may be formed as complimentary embroidered contact points as discussed in this document, but may also be formed using other techniques, such as etching and deposition to name a few examples. In this approach, the traces in the cover 404 are spaced apart from the nodes 408 embroidered in the sensor assembly 102 until force is applied. When force is applied in relation to a control indication, an associated protrusion comes in contact with a corresponding node 408 and triggers a corresponding control action.

Figure 5:
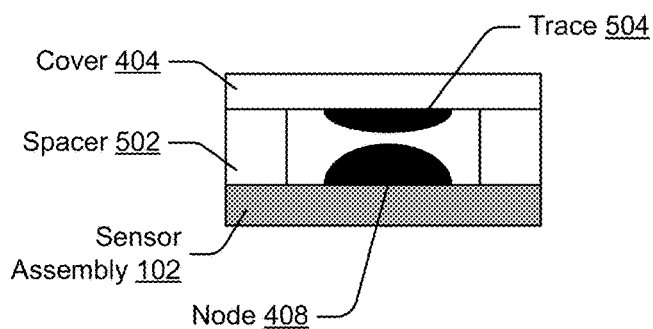
FIG. 5 depicts an example scenario showing operation of controls that utilize embroidered sensors in accordance with one or more implementations.
Figure 5:
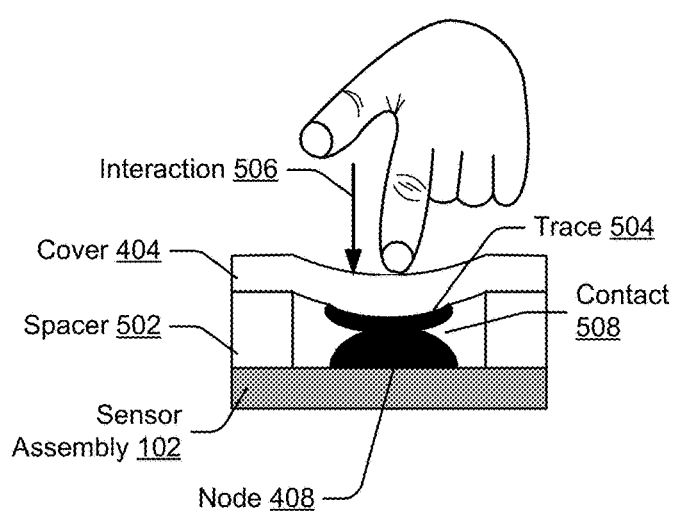

To further illustrate, FIG. 5 depicts generally at 500 an example scenario showing operation of controls that utilize embroidered sensors in accordance with one or more implementations. In particular, a view "A" depicts an arrangement of a control for an input device that is formed using techniques discussed herein. In particular, the control is formed with a cover 404 that is joined to a sensor assembly 102. The cover 404 and sensor assembly 102 are spaced apart using a spacer 502 such as foam or pressure sensitive adhesive. Here, the sensor assembly 102 includes an embroidered node 408 for the control and the cover 404 includes a complimentary trace 504 of conductive material, which may or not be configured as an embroidered node. In the absence of applied force, the spacer 502 maintains space between the node 408 and the corresponding trace 504 as represented in view "A".

In view "B" interaction 506 is represented (e.g., pressing of a control indication) that applies force to the cover 404 and causes a deformation of the cover in the area of the example control. As represented in view "B", the applied force causes contact 508 to occur between the trace 504 and the node 408. The contact 508 can be recognized as input via a sensor controller 218 and/or input manger module 220 and a corresponding control action is performed in response to the recognized input.

Input Device Having an Embroidered Sensor Assembly

As noted, a sensor assembly 102 as described herein can be embedded within a rigid structure to form a variety of different devices and smart objects. For example, a touch panel or other embroidered sensor arrangement can be embedded into a thermoformed rigid structure such as a structure formed from a thermoset or thermoplastic material, a carbon fiber composite, or various other types of polymers and composites. Embedding of an embroidered sensor assembly in this manner can be employed to add a smart sensor array and/or touch functionality to practically any type of device or object. This includes but is not limited to adding a sensor assembly 102 to protective gear such as helmets and body armor; sporting goods such as bikes, racquets, balls, etc.; toys; structural objects in vehicles and industrial equipment; pipes and panels; household items and appliances; and so on.

Figure 6:
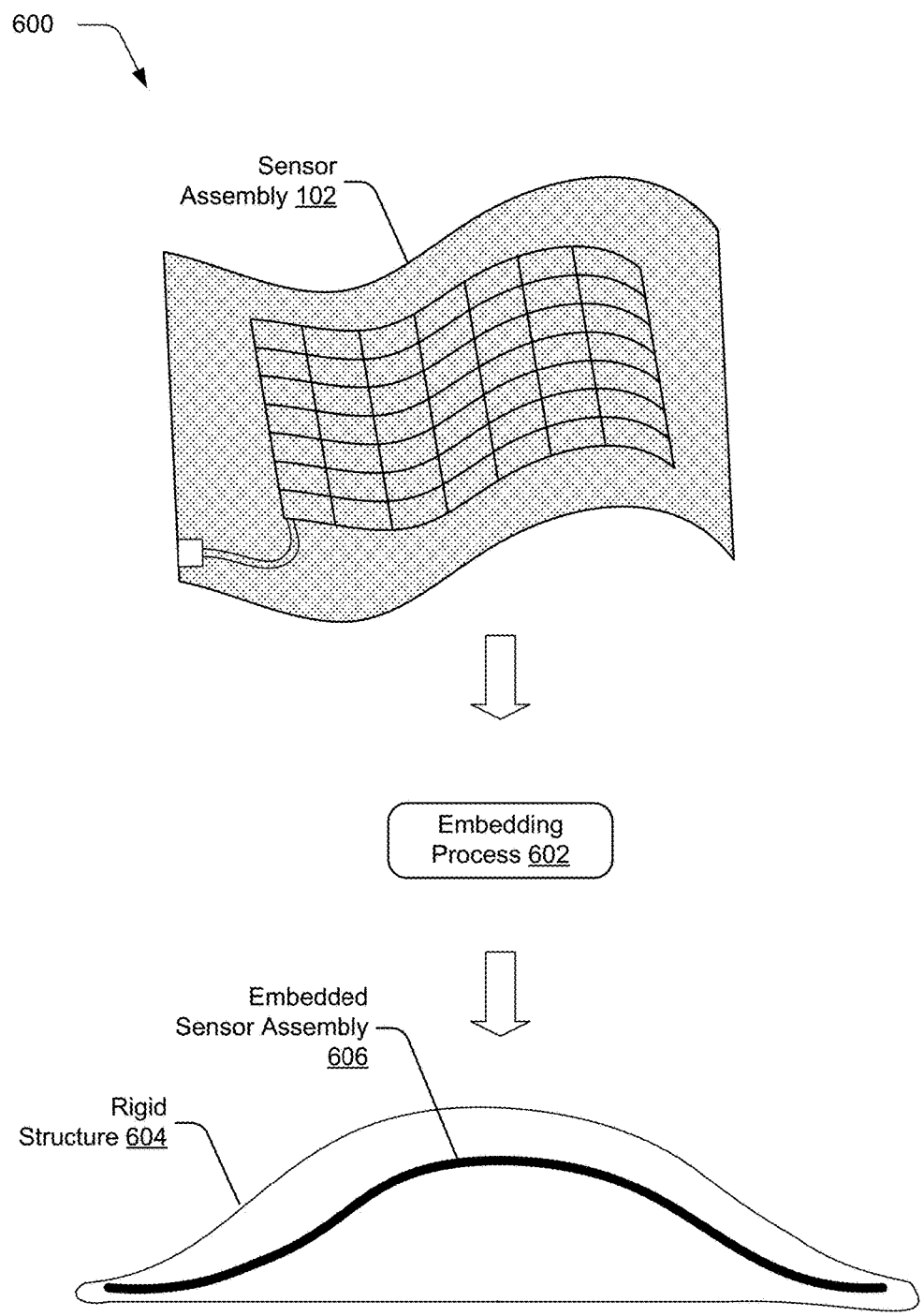
FIG. 6 depicts an example device having a rigid structure in which an embroidered sensor assembly is embedded in accordance with one or more implementations.

FIG. 6 depicts generally at 600 an example device having a rigid structure in which an embroidered sensor assembly is embedded in accordance with one or more implementations. In particular, a sensor assembly 102 having a plurality of embroidered sensors 106 can be created as described in this document. The flexible sensor assembly 102 can be manipulated into various shapes and configurations. For example, the sensor assembly 102 can be wrapped around objects, formed into a mold, or otherwise arranged into a selected configuration for inclusion in a device or object. A rigid structure for the device or object can then be formed to surround and encompass the sensor assembly 102 via suitable embedding process 602. The embedding process 602 produces a rigid structure 604 that contains an embedded sensor assembly 606 as represented in FIG. 6.

By way of example and not limitation, the embedding process 602 may involve surrounding an arrangement of a sensor assembly 102 with a thermosetting resin and curing the thermosetting resin by applied heat or radiation to form the rigid structure 604. In another example, the embedding process 602 involves arranging the sensor assembly 102 in a mold and then melting a thermoplastic polymer and press molding or injection molding the thermoplastic polymer to surround the sensor assembly 102 and form the rigid structure 604. Other types of processes suitable to embedded a sensor assembly 102 within a rigid structure are also contemplated, such as various co-cure, co-extrude, and/or composite fabrication techniques. In one or more implementations, the flexible substrate is selected to provide added strength to the composite object is formed. In particular, the flexible substrate can be selected as a permeable fabric that acts as a scrim for reinforcement of the rigid structure 604. In this approach, the thermoformed material for the rigid structure 604 penetrates the permeable fabric and when cured forms supporting structures that extend through the permeable fabric and provide reinforcement of the composite object (e.g., enhanced strength properties).

Figure 7:
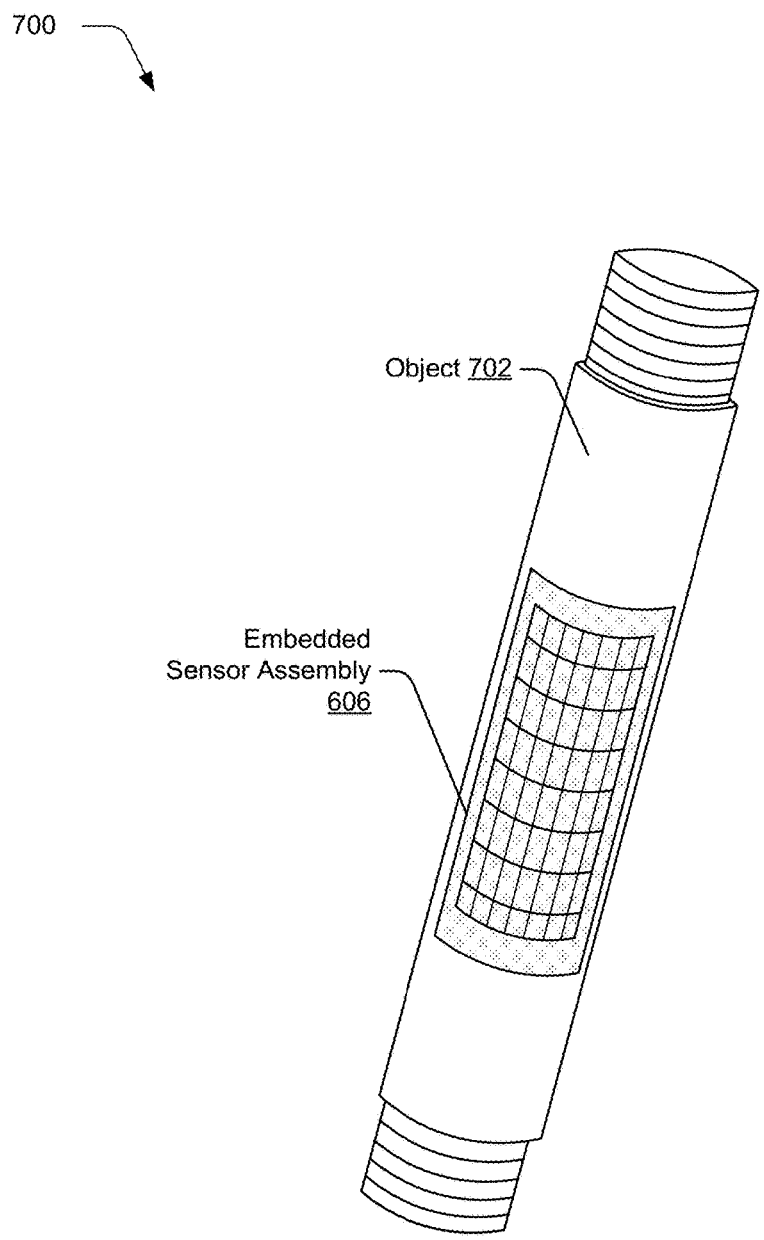
FIG. 7 depicts an example object having an embedded embroidered sensor assembly in accordance with one or more implementations.

To further illustrate, FIG. 7 depicts generally an example object 702 having an embedded sensor assembly 606 in accordance with one or more implementations. In particular, the object 702 is represented as a length of pipe. Various other types of smart objects as described herein can be configured in a comparable manner. The embedded sensor assembly 606 in FIG. 7 comprises an array of embroidered sensors 106 as discussed herein. The embedded sensor assembly can be formed with the pipe using an embedding process 602 as previously discussed. Thus, the embedded sensor assembly 606 can be surrounded by the walls of the pipe and extend at least partially around the circumference of the pipe. The embedded sensor assembly 606 can implement a touch sensitive or other smart surface that is embedded with the pipe or other object. In addition or alternately, the embedded sensor assembly 606 can be configured as a gauge, meter, detector, or other process control sensor. In the context of the example pipe, the embedded sensor assembly 606 may operate to measure various characteristic related to material conveyed via the pipe such as direction, flow rates, turbulence, and so forth.

In a particular example, an embedded sensor assembly 606 for the example pipe or other object can also be configured to operate as an embedded strain gauge. For instance, an arrangement of embroidered sensors as discussed herein can be configured as a pattern of wires that enable measurement of strain based on positional relationships between nodes formed by the pattern of wires. As the pipe or object flexes, the positional relationships are altered and can be detected by a sensor controller 218 or other comparable control system. Strain can be computed analytically based on deformation of the nodes of the sensor assembly in comparison to the original configuration and positions. Strain can be deduced at each individual node, which can then be used to create a strain profile or map for the object. The embedded strain gauge provides a non-invasive, built-in mechanism for strain measurements that can be employed in a variety of contexts. For example, the embedded strain gauge can be used for pipes and other industrial equipment, building structures, aircraft wings and parts, automobile components, and pressure vessels, and other composite objects and devices, to name a few examples.

Example Procedures

In the context of the foregoing example devices, techniques, and details, this section described example procedures in accordance with one or more implementations of embroidered sensor assemblies. The procedures are represented as a set of blocks that specify operations performed by one or more entities and are not necessarily limited to the orders shown for performing the operations by the respective blocks. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples in this description.

Figure 8:
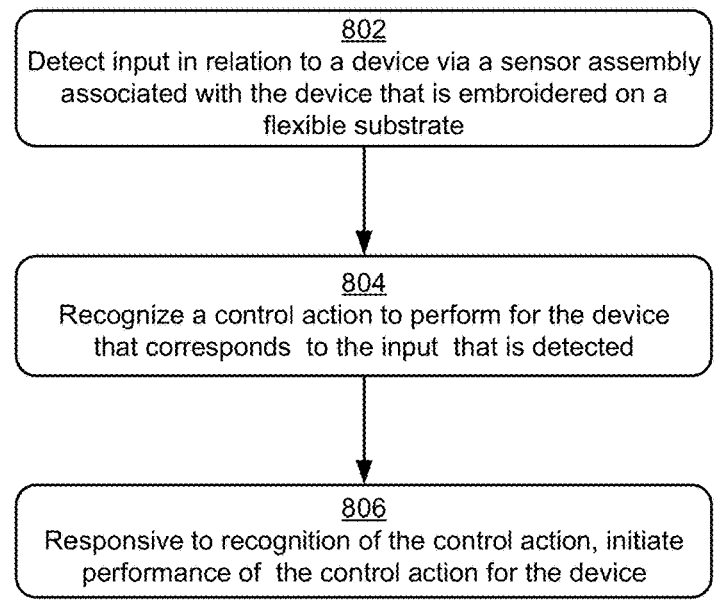
FIG. 8 is a flow diagram depicting an example procedure in which control actions are performed in response to input obtained via an embroidered sensor assembly in accordance with one or more implementations.

FIG. 8 is a flow diagram depicting an example procedure 800 in which control actions are performed in response to input obtain via an embroidered sensor assembly in accordance with one or more implementations. Input is detected in relation to a device via a sensor assembly associated with the device that is embroidered on a flexible substrate (block 802). For example, interaction may occur with a sensor assembly 102 as described herein that is included in some type of device or smart object. The interaction may define input for control of functionality of the device/object such as to navigate content, launch an application, invoke device functions, input text characters or data, initiate communications, collect data, and/or otherwise cause particular control actions.

A control action to perform for the device is recognized that corresponds to the input that is detected (block 804) and responsive to recognition of the control action, performance of the control action is initiated for the device (block 806). For example, a sensor controller 218 can process the input and/or invoke an input manager module 220 to ascertain a control action that is associated with the input that is obtained via the embroidered sensor assembly. Various different actions can be associated with sensors and controls implemented via the sensors to control device operations. Different actions can be triggered in dependence upon a context of the interaction, such as a mode of the device, the application being used, the particular sensors and controls that are actuated, gesture associated with the input, and so forth. Once a particular control action or actions associated with detected input are determined, the corresponding actions are performed to manipulate device functionality and/or interact with content in the manner specified by the recognized actions.

Figure 9:
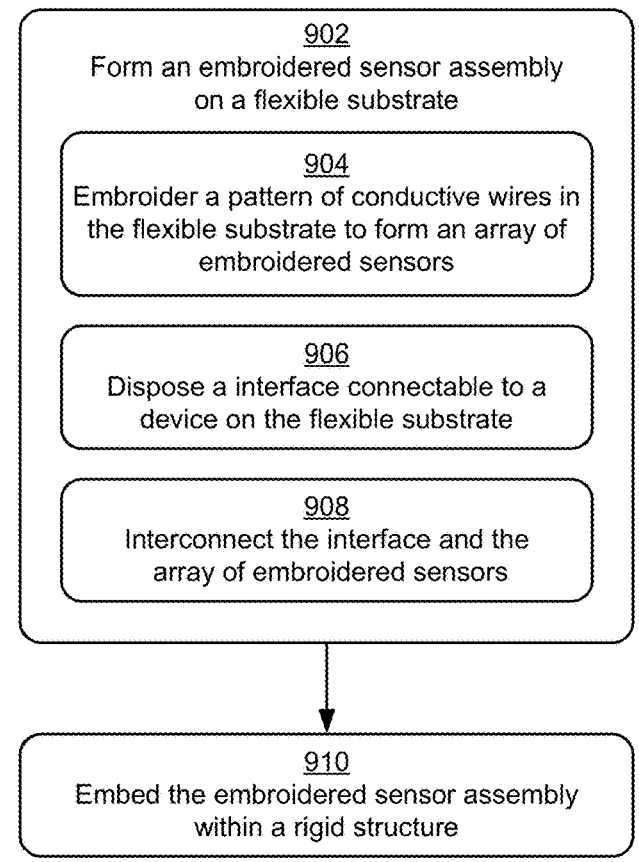
FIG. 9 is a flow diagram depicting an example procedure in an embroidered sensor assembly is formed and embedded in a rigid structure in accordance with one or more implementations.

FIG. 9 is a flow diagram depicting an example procedure 900 in which an embroidered sensor assembly is formed and embedded in a rigid structure in accordance with one or more implementations. An embroidered sensor assembly is formed on a flexible substrate (block 902). For example, a sensor assembly 102 as discussed throughout this document can be created for inclusion in various devices and objects and to provide various different sensing capabilities. Formation of the assembly includes embroidering a pattern of conductive wires in the flexible substrate to form an array of embroidered sensors (block 904). Wires can be embroidered in various patterns and in a single layer or multiple layers of substrate depending upon the end use application. In addition, an interface connectable to a device is disposed on the flexible substrate (block 906) and the interface and the array of embroidered sensors are interconnected (block 908). Various wired and wireless interfaces are contemplated that enable connection of the embroidered sensor assembly to a sensor system of a device in which the assembly is included and/or a connection to an external device, server, or service.

The embroidered sensor assembly that is constructed provides a flexible sensor platform that can be utilized in various ways described throughout this document. This includes implementation in items such as articles of clothing, flexible displays, soft/flexible input devices, wearable devices, and so forth. In some implementations, though, the embroidered sensor assembly is embedded within a rigid structure (block 910). For example, any suitable embedding process 602 as discussed in relation to FIG. 6 can be employed to produce a rigid structure 604 for a device or object. The embroidered sensor assembly that is embedded within a rigid structure provide sensing functionality for the device, which can include touch sensing functionality implemented by one or more touch sensitive surfaces. As noted thermosetting and thermoplastic materials as well as carbon fiber and other composites can be used to produce rigid structures 604 for a device or object that encompass embroidered sensor assembly.

Example System

Figure 10:
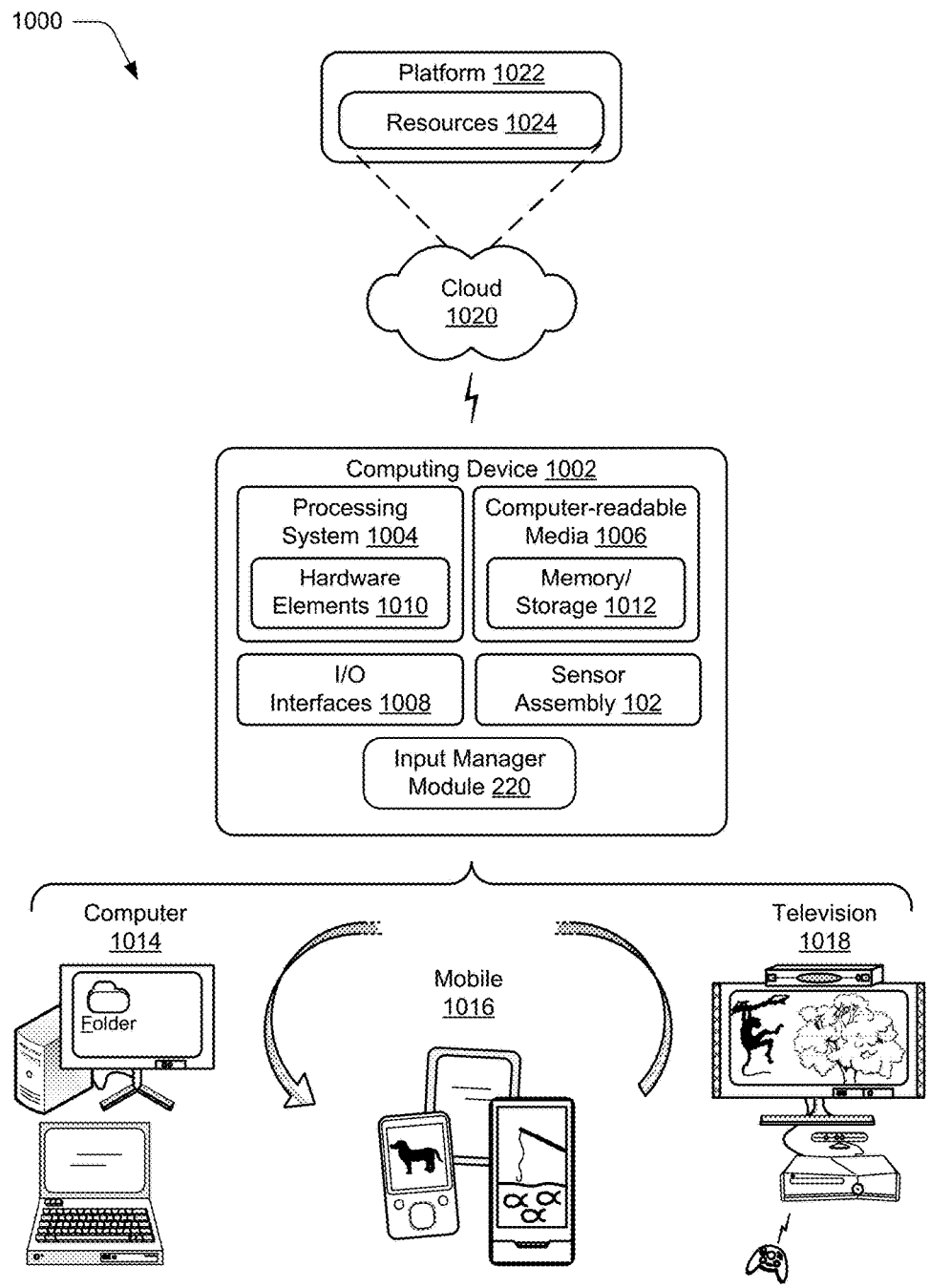
FIG. 10 illustrates various components of an example system that can be employed to implement devices and techniques related to embroidered sensor assemblies as described herein.

FIG. 10 illustrates an example system 1000 that includes an example computing device 1002 that is representative of one or more computing systems and/or devices that may implement the various techniques described herein. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, tactile-response device, and so forth. The computing device 1002 may further include various components to enable wired and wireless communications including for example a network interface card for network communication and/or various antennas to support wireless and/or mobile communications. A variety of different types of antennas suitable are contemplated including but not limited to one or more Wi-Fi antennas, global navigation satellite system (GNSS) or global positioning system (GPS)

antennas, cellular antennas, Near Field Communication (NFC) 214 antennas, Bluetooth antennas, and/or so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" refers to signal-bearing media configured to transmit instructions to the hardware of the computing device 1002, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules input manager module 220, operating system 206, applications 208 and other program modules may be implemented as one or more instructions and/or logic embodied on some form of computer-readable media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This is illustrated through inclusion of the input manger module 220 on the computing device 1002. The functionality of the input manger module 220 and other modules may also be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality.

EXAMPLE IMPLEMENTATIONS

Example implementations of techniques described herein include, but are not limited to, one or any combinations of one or more of the following examples:

Example 1

A sensor assembly comprising: a flexible substrate; a pattern of conductive wires embroidered in the flexible substrate to form an array of touch sensitive sensors; and an interface disposed on the flexible substrate and in communication with the pattern of conductive wires.

Example 2

The sensor assembly of any one or more of the examples in this section, wherein the pattern of conductive wires is formed as a single layer.

Example 3

The sensor assembly of any one or more of the examples in this section, wherein the array of touch sensitive sensors comprises electrodes formed by intersections of the pattern of conductive wires.

Example 4

The sensor assembly of any one or more of the examples in this section, wherein the array of touch sensitive sensors are arranged to enable detection of distortions in an electrostatic field applied to the array, the distortions measurable as changes in capacitance.

Example 5

The sensor assembly of any one or more of the examples in this section, wherein the array of touch sensors is arranged to enable measurement of mutual-capacitance between nodes formed by the pattern of conductive wires.

Example 6

The sensor assembly of any one or more of the examples in this section, wherein conductive wires comprise insulated metal wires.

Example 7

The sensor assembly of any one or more of the examples in this section, wherein the flexible substrate comprises a fabric material.

Example 8

The sensor assembly of any one or more of the examples in this section, wherein the sensor assembly is embedded within a rigid structure.

Example 9

The sensor assembly of any one or more of the examples in this section, wherein the sensor assembly is configured to attach to a cover having control indications to form a flexible input device having a plurality of touch sensitive controls.

Example 10

A device comprising: a flexible substrate having an arrangement of sensors embroidered in a single layer; and a sensor controller operable to detect input signals via the arrangement of sensors and initiate control actions to control functionality of the device responsive to detection of the input signals.

Example 11

The device of any one or more of the examples in this section, wherein the device comprises a flexible input device having a plurality of controls corresponding to nodes formed by the arrangement of sensors.

Example 12

The device of any one or more of the examples in this section, wherein the device comprises a rigid object in which the arrangement of sensors is embedded.

Example 13

The device of any one or more of the examples in this section, wherein the sensors comprise mutual-capacitive sensors designed to form a touch sensitive surface for the device, the mutual-capacitive sensors including a pattern of driving lines and sensing lines that are embroidered as insulated conductive wires within the single layer.

Example 14

The device of any one or more of the examples in this section, wherein the arrangement of sensors is configured as a pattern of wires that enable measurement of strain based on positional relationships between nodes formed by the pattern of wires.

Example 15

The device of any one or more of the examples in this section, wherein the device further comprises an interface connectable to a computing device, the interface enabling communication of data associated with the input signals to the computing device for processing.

Example 16

The device of any one or more of the examples in this section, wherein sensors of the arrangement of sensors comprise conductive nodes formed by intersections of a conductive wire that is embroidered in the single layer as a continuous wire.

Example 17

An apparatus comprising a rigid structure encompassing an embedded sensor assembly, the embedded sensor assembly including: a flexible substrate; and a pattern of insulated conductive wires embroidered in the flexible substrate to form an array of nodes operable as mutual-capacitive sensors that enable detection of distortions in an electrostatic field applied to the array of nodes.

Example 18

The apparatus of any one or more of the examples in this section, wherein the rigid structure comprises a thermoformed material surrounding a single layer of the flexible substrate having the pattern of insulated conductive wires.

Example 19

The apparatus of any one or more of the examples in this section, wherein the rigid structure comprises a thermoformed material and the flexible substrate comprises a permeable fabric that acts as a scrim for reinforcement of the rigid structure.

Example 20

The apparatus of any one or more of the examples in this section, wherein the embedded sensor assembly creates a touch sensitive surface for the apparatus.

Conclusion

Although aspects of embroidered sensor assemblies have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A sensor assembly comprising:
   a flexible substrate;
   a pattern of conductive wires embroidered onto the flexible substrate to form an array of touch sensitive sensors, the pattern of conductive wires including a first conductive wire and a second conductive wire;
   a first node formed by additional material stitched at a first intersection point in the pattern of conductive wires, the first intersection point corresponding to a region in the pattern of conductive wires where the first conductive wire intersects the second conductive wire; and
   an interface disposed on the flexible substrate and in communication with the pattern of conductive wires.

2. The sensor assembly of claim 1, wherein the pattern of conductive wires is formed as a single layer.

3. The sensor assembly of claim 1, wherein the array of touch sensitive sensors comprises electrodes formed by intersections of the pattern of conductive wires.

4. The sensor assembly as described in claim 1, wherein the array of touch sensitive sensors is arranged to enable detection of distortions in an electrostatic field applied to the array, the distortions measurable as changes in capacitance.

5. The sensor assembly as described in claim 1, wherein the first conductive wire extends through the flexible substrate in a first direction, the second conductive wire extends through the flexible substrate in a second direction, and wherein the first direction is substantially orthogonal to the second direction.

6. The sensor assembly as described in claim 1, wherein the conductive wires comprise insulated metal wires.

7. The sensor assembly as described in claim 1, wherein the flexible substrate comprises a fabric material.

8. The sensor assembly as described in claim 1, wherein the sensor assembly is embedded within a rigid structure.

9. The sensor assembly as described in claim 1, wherein the sensor assembly is configured to attach to a cover having control indications to form a flexible input device having a plurality of touch sensitive controls.

10. A device comprising:
    a flexible substrate having an arrangement of conductive wires embroidered onto the flexible substrate, the arrangement of the conductive wires including a plurality of conductive nodes formed at intersections between the embroidered conductive wires, one or more of the conductive nodes including raised protrusions comprising portions of additional material stitched onto the flexible substrate; and
    a sensor controller operable to detect input signals via the arrangement of conductive wires and initiate control actions to control functionality of the device responsive to detection of the input signals.

11. The device as described in claim 10, wherein the device comprises a rigid object in which the arrangement of conductive wires is embedded.

12. The device as described in claim 10, wherein the conductive wires comprise mutual-capacitive sensors designed to form a touch sensitive surface for the device, the mutual-capacitive sensors including a pattern of driving lines and sensing lines corresponding to the embroidered conductive wires.

13. The device as described in claim 10, wherein the arrangement of conductive wires is configured as a pattern of sensors that enable measurement of strain based on positional relationships between the conductive nodes formed by the pattern of the conductive wires.

14. The device as described in claim 10, wherein the device further comprises an interface connectable to a computing device, the interface enabling communication of data associated with the input signals to the computing device for processing.

15. The device as described in claim 10, wherein the arrangement of conductive wires forms a pattern of sensors that are embroidered onto a single layer of the flexible substrate.

16. An apparatus comprising a rigid structure encompassing an embedded sensor assembly, the embedded sensor assembly including:
a flexible substrate; and
a pattern of insulated conductive wires embroidered onto the flexible substrate to form an array of nodes operable as mutual-capacitive sensors that enable detection of distortions in an electrostatic field applied to the array of nodes, the array of nodes formed by intersections of the insulated conductive wires, one or more of the nodes including additional material stitched onto the flexible substrate in a region associated with the intersection, the additional material protruding away from a surface of the flexible substrate.

17. The apparatus as described in claim 16, wherein the rigid structure comprises a thermoformed material surrounding a single layer of the flexible substrate having the pattern of insulated conductive wires.

18. The apparatus as described in claim 16, wherein the rigid structure comprises a thermoformed material and the flexible substrate comprises a permeable fabric that acts as a scrim for reinforcement of the rigid structure, the thermoformed material of the rigid structure penetrating the permeable fabric to form a supporting structure that extends from the thermoformed material through the permeable fabric to provide the reinforcement.

19. The apparatus as described in claim 16, wherein the embedded sensor assembly creates a touch sensitive surface for the apparatus.

20. The device as described in claim 10, wherein the device comprises a flexible input device having a plurality of controls corresponding to nodes formed by the arrangement of sensors.

* * * * *